(12) United States Patent
Platner

(10) Patent No.: US 6,663,110 B2
(45) Date of Patent: Dec. 16, 2003

(54) HYDROPHOBIC SHAFT SEAL

(75) Inventor: David K. Platner, Shelby, MI (US)

(73) Assignee: Meritor Heavy Vehicle Technology LLC, Troy, MI (US)

( * ) Notice: Subject to any disclaimer, the term of this patent is extended or adjusted under 35 U.S.C. 154(b) by 36 days.

(21) Appl. No.: 10/020,360

(22) Filed: Dec. 12, 2001

(65) Prior Publication Data

US 2003/0107184 A1 Jun. 12, 2003

(51) Int. Cl.[7] .................................................. F16J 15/32
(52) U.S. Cl. ........................ 277/563; 277/549; 277/562; 277/346; 277/350; 277/351
(58) Field of Search ................................ 277/549, 562, 277/563, 346, 350, 351

(56) References Cited

U.S. PATENT DOCUMENTS

| | | | |
|---|---|---|---|
| 2,177,441 A | * | 10/1939 | Pesarese ...................... 277/563 |
| 2,625,446 A | * | 1/1953 | Bjornstad .................... 277/563 |
| 3,183,008 A | * | 5/1965 | Yost ............................ 277/438 |
| 3,981,812 A | * | 9/1976 | Zletz .......................... 508/209 |
| 4,243,529 A | | 1/1981 | Strauss |
| 4,344,630 A | | 8/1982 | Veres |
| 4,792,243 A | | 12/1988 | Takeuchi et al. |
| 4,862,755 A | * | 9/1989 | Eastman et al. ........... 74/15.88 |
| 5,024,449 A | | 6/1991 | Otto |
| 5,053,661 A | | 10/1991 | Kitamura et al. |
| 5,282,764 A | | 2/1994 | Glen |
| 5,308,087 A | * | 5/1994 | Schmitt ..................... 277/351 |
| 5,342,065 A | * | 8/1994 | Blanke ....................... 277/389 |
| 5,344,163 A | | 9/1994 | Roll et al. |
| 5,409,240 A | | 4/1995 | Ballard |
| 5,622,435 A | | 4/1997 | Hiller et al. |
| 5,624,191 A | | 4/1997 | Fuchs et al. |
| 5,636,848 A | | 6/1997 | Hager et al. |
| 5,687,973 A | | 11/1997 | Ruppert, Jr. |
| 5,697,710 A | | 12/1997 | Iida et al. |
| 5,709,135 A | * | 1/1998 | Baxter ........................ 74/607 |
| 5,947,480 A | | 9/1999 | Sherman et al. |
| 5,977,676 A | | 11/1999 | Wijdenes |
| 6,008,557 A | | 12/1999 | Dornhoefer et al. |
| 6,079,879 A | | 6/2000 | Takahashi |
| 6,176,618 B1 | | 1/2001 | Kawawada et al. |
| 6,186,510 B1 | | 2/2001 | Reagan |
| 6,247,702 B1 | | 6/2001 | Long et al. |
| 6,386,546 B1 | * | 5/2002 | Fedorovich ................. 277/351 |

* cited by examiner

Primary Examiner—Anthony Knight
Assistant Examiner—Enoch E Peavey
(74) Attorney, Agent, or Firm—Carlson, Gaskey & Olds PC

(57) ABSTRACT

A seal assembly seal assembly includes an outer member, an inner member, and a resilient member therebetween. The resilient member is located between an inner diameter of the outer member and an outer diameter of the inner member. The resilient member includes substantially V-shaped or opposed parabolic members in cross-section which define a cavity therebetween. The cavity formed between the parabolic members is filled with the hydrophobic material to provide a barrier to undesirable moisture, lubricate the interface between the parabolic members and the outer diameter of the inner member, and further minimize ingestion of contaminants.

20 Claims, 3 Drawing Sheets

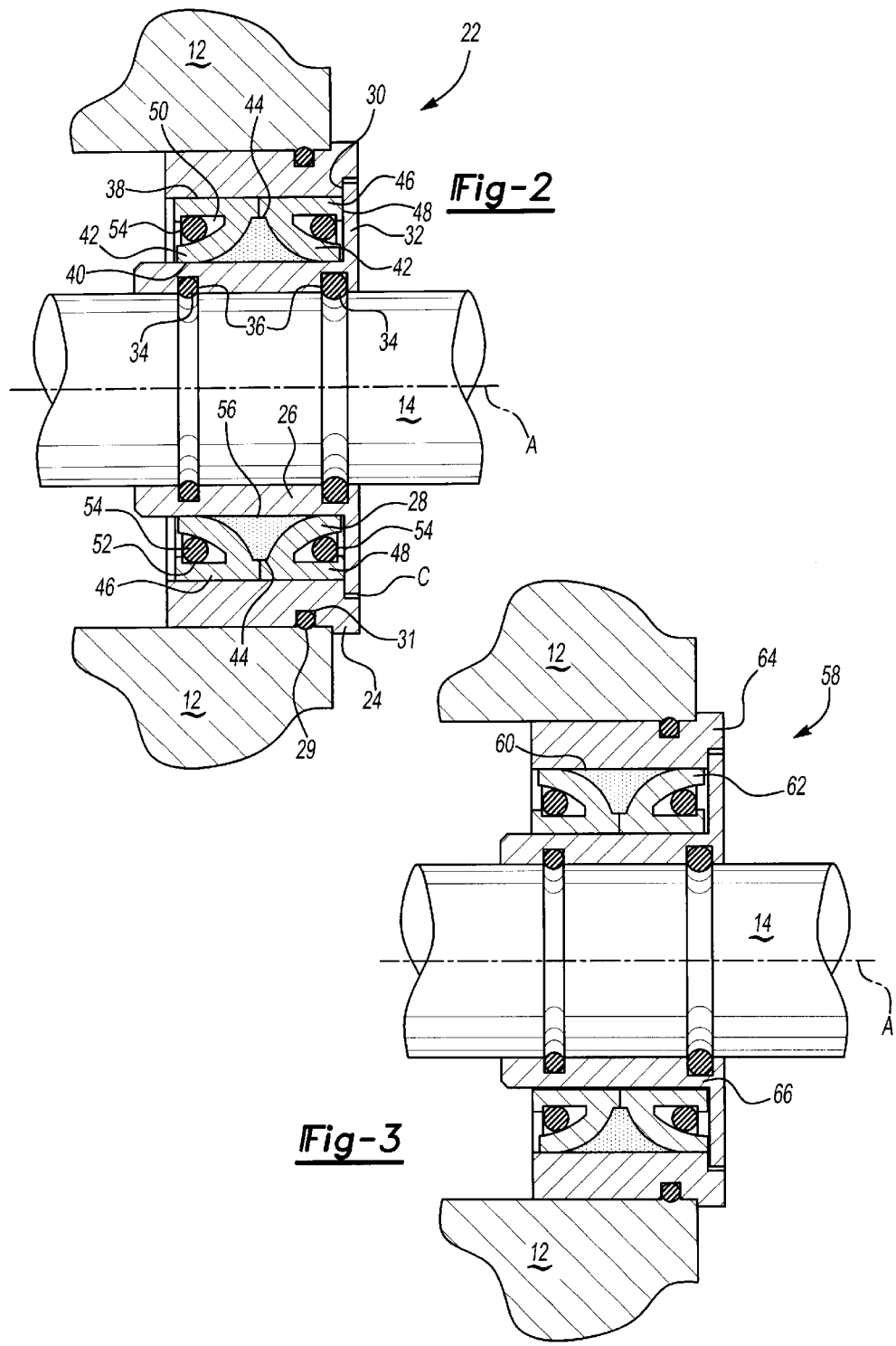

HYDROPHOBIC SHAFT SEAL

BACKGROUND OF THE INVENTION

The present invention relates to a seal assembly, and more particularly to a shaft seal for an axle assembly.

A shaft extending through a housing often require resilient seals between the shaft and the housing through which it extends. One such housing mounts a carrier shaft that provides rotational drive to a differential of an axle. The shaft extends through the housing and is supported on bearings within. The interior of the housing is filled with a lubricant to insure proper operation of the internal components.

There are extreme differences between the interior environment of such a housing and the exterior environment in which the axle resides. That is, operating conditions may require that the seal between the shaft and the bearing housing inhibit water, air, dirt particles or other foreign objects from contaminating or otherwise deteriorating the lubricant content within the bearing housing while the exterior of the axle is subject to very harsh environmental factors.

Complex seals such as triple lip seals are typically utilized to provide an effective oil seal between the relatively rotating spindle shaft and the housing. Triple lip seals include multiple complex outer components such as slingers to protect the relatively more delicate internal fluid seal components. Such seals are complex to manufacture and rather expensive to produce.

Accordingly, it is desirable to provide a robust seal for a rotating shaft to prevent foreign objects from contaminating the lubricant content within the housing while minimizing the relatively more delicate internal components.

SUMMARY OF THE INVENTION

The seal assembly according to the present invention separates the extreme differences between the interior environment of a housing such as a differential and the exterior environment to which the housing is exposed. The seal assembly retains lubricant within the housing while preventing external contaminants from entering adjacent a rotating shaft.

The seal assembly includes an outer member, an inner member, and a resilient member therebetween. The resilient member is located between an inner diameter of the outer member and an outer diameter of the inner member. The resilient member includes substantially V-shaped or opposed parabolic members in cross-section which define a cavity therebetween. The parabolic members engage the outer diameter of the inner member and "wipe" the outer diameter of the inner member as the inner member rotates relative to the resilient member. The cavity formed between the parabolic members is filled with the hydrophobic material to provide a barrier to undesirable moisture, lubricate the interface between the parabolic members and the outer diameter of the inner member, and further minimize ingestion of contaminants.

The present invention therefore provides a robust seal for a rotating shaft to prevent foreign objects from contaminating the lubricant content within the housing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is an exploded sectional view of a seal assembly according to the present invention;

FIG. 3 is an exploded sectional view of another seal assembly according to the present invention.

DETAILED DESCRIPTION OF THE PREFERRED EMBODIMENT

Figure 1:
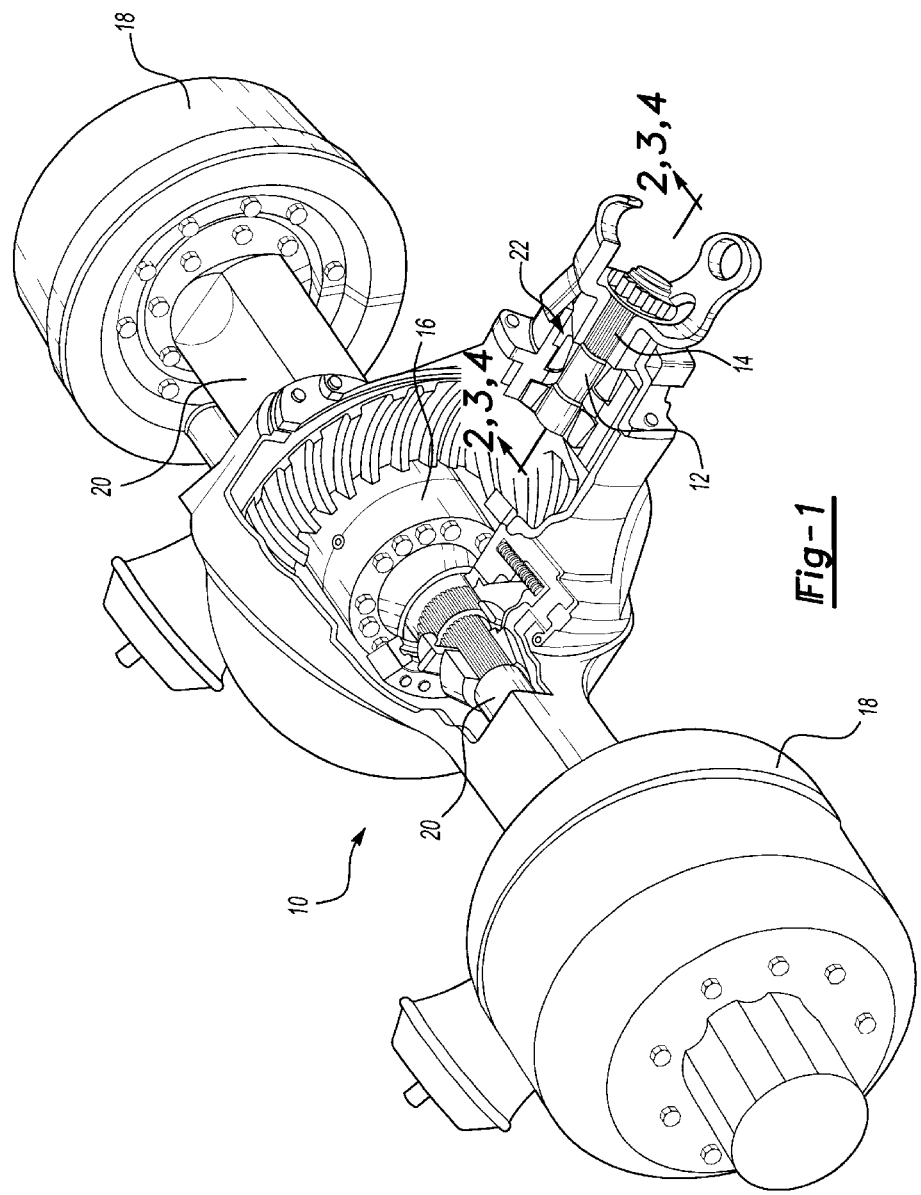
FIG. 1 is a general partial sectional view of an axle assembly of the present invention taken along x—x of FIG. 1.

FIG. 1 illustrates a general perspective view of an axle assembly 10 having a housing 12. An input shaft 14 drives a gear arrangement 16 to drive hubs 18 through a first and second axle shaft 20. Preferably, the gear arrangement 16 includes a differential such that the first and second axle shaft 20 may rotate at different speeds. A fluid lubricant such as oil is deposited within the housing 12 to insure the proper functioning of the gear arrangement 16 and shafts contained within the housing 12. It should be understood that although an axle assembly is disclosed in the illustrated embodiment, other housings will benefit from the present invention.

A seal assembly 22 is positioned in the housing 12 such that the shaft 14 rotatably extends therethrough. The seal assembly 22 separates the extreme differences between the interior environment of the housing 12 and the exterior environment to which the housing 12 is exposed. Generally, the seal assembly 22 retains the lubricant within the housing 12 while preventing external contaminants from entering adjacent the rotating shaft.

Referring to FIG. 2, an exploded view of the seal assembly 22 is illustrated. The seal assembly 22, generally includes an outer member 24, an inner member 26, and a resilient member 28 therebetwen. An axis A is defined along the shaft 14.

The outer member 24 is preferably substantially cylindrical and is fixedly mounted within the housing 12. A seal 29 such as an O-ring is preferably mounted within a groove 31 along the outer diameter of the outer member 24 to further assure a seal between the outer member 24 and the housing 12. It should be understood that although the present invention is described as having a fixed (relative to the housing 12) outer member, the opposite arrangement will also benefit. That is, a rotationally fixed inner member and a rotatable outer member.

A counterbore 30 is preferably formed in an exposed face of the outer member 24 to receive a flange 32 which radialy extends from the inner member 26 such that relatively large dirt, stones, or other particles are prevented from reaching the resilient member 28. Preferably, a clearance C is formed between the counterbore 30 and flange 32 such that the relative rotation between the outer member 24 and the inner member 26 operates as a self-draining slinger to eject smaller contaminants through the clearance C thereby further protecting the resilient member 28. The clearance C is maintained as the shaft 14 and inner member 26 are supported by bearings (not shown) within the housing and the outer member 24 is fixed to the housing 12.

The inner member 26 is preferably substantially cylindrical to receive the shaft 14 therethrough. An internal seal 34 such as an O-ring is preferably mounted within a groove 36 along the inner diameter of the inner member 26 to further assure a seal between the inner member 26 and the shaft 14. The inner member 26 rotates with the shaft 14.

The resilient member 28 is located between an inner diameter 38 of the outer member 24 and an outer diameter 40 of the inner member 26. The resilient member 28 may be molded of rubber or polytetraflouretylene or other materials having relatively good sliding characteristics. Preferably, the resilient member 28 includes substantially V-shaped or opposed parabolic members 42 in cross-section which define a cavity 44 therebetween. It should be understood that the cavity 44 is defined about the entire circumference substantially annular resilient member 28.

The parabolic members 42 engage the outer diameter 40 of the inner member 26 and "wipe" the outer diameter 40 of the inner member 26 as the inner member 26 rotates relative to the resilient member 28. Preferably, the opposed parabolic members 42 extend from a resilient member outer diameter 46 that is substantially parallel to the axis A. An edge 48 of the resilient member outer diameter 46 preferably abuts the flange 32 to minimize ingestion of smaller contaminants between the inner member 24 and outer members 26. Preferably, an inner diameter 50 of the resilient member outer diameter 46 include a groove 52 to receive a seal 54 such as an O-ring between the resilient member outer diameter 46 and each opposed parabolic member 42. Seal 54 provides additional resilience to each opposed parabolic member 42 to thereby further maintain contact between the parabolic members 42 and the outer diameter 40 of the inner member 26 to assure retention of a hydrophobic material 56 within the cavity 44.

The cavity 44 formed between the parabolic members 42 is filled with the hydrophobic material (illustrated schematically at 56) to provide a barrier to undesirable moisture, lubricate the interface between the parabolic members 42 and the outer diameter 40 of the inner member 26, and further minimize ingestion of contaminants. The cavity 44 is defined by the parabolic members 42 which are preferably arranged to minimize turbulent flow of the hydrophobic material 56 under the operating conditions of the seal assembly 22. The parabolic members 42 may be molded directly into the parabolic shape or formed generally in a V-shape and obtain the parabolic shape based upon the relationship between the inner and outer members.

The hydrophobic material 56 is preferably a hydrophobic silicon gel such as that manufactured by DuPont under the trade name Krytox. Other hydrophobic materials such as foam and "sticky grease" manufactured by DuPont and Dow under the trade names Zonyl and Voranol, respectively will also benefit from the present invention.

Referring to FIG. 3, another seal assembly 58 is disclosed. The seal assembly 58 is similar to the seal assembly of FIG. 2, with the cavity 60 of the resilient member 62 directed toward the outer member 64 an not the inner member 66. Seal assembly 58 is preferred for applications in which the outer member 64 rotates relative to the stationary inner member 66.

Figure 4:
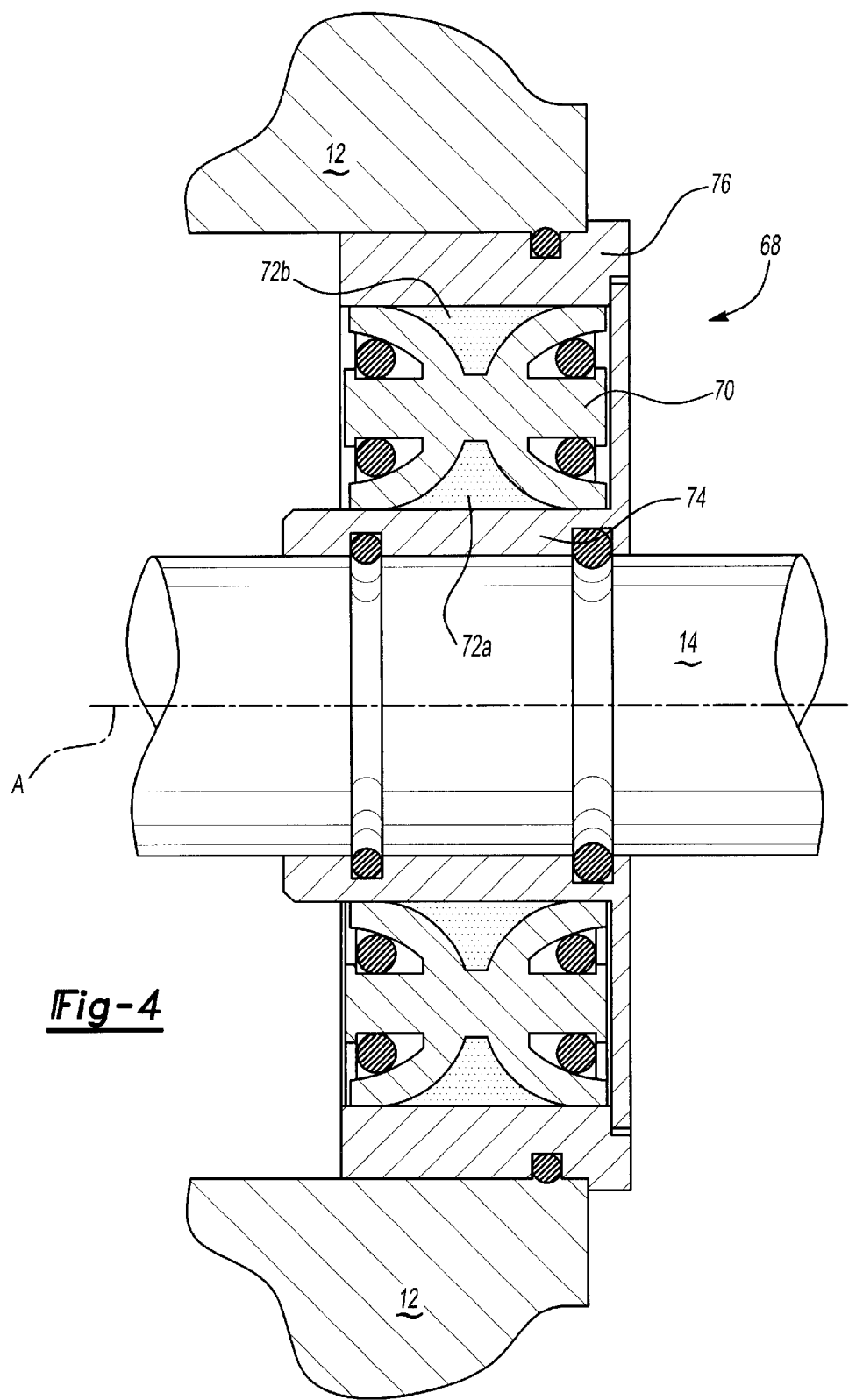
FIG. 4 is an exploded sectional view of a seal assembly according to the present invention.

Referring to FIG. 4, another seal assembly 68 is disclosed. The seal assembly 68 is similar to the seal assembly of FIG. 2, but the resilient member 70 defines a pair of opposed cavities 72A,72B. Cavity 72A, is directed toward the inner member 74 and cavity 72B is directed toward the outer member 76. Seal assembly 68 provides a resilient member 70 which essentially floats between the inner an outer member 74,76 thereby providing additional frictional reduction.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A seal assembly for a housing having a fluid therein, comprising:
   an first member;
   an second member rotatable relative to said first member;
   a resilient member adjacent said first member and said second member, said resilient member defining a resilient member outer diameter and a first and a second parabolic member which define a cavity;
   a first annular seal mounted between said resilient member outer diameter and said first parabolic member to bias said first parabolic member away from said resilient member outer diameter;
   a second annular seal mounted between said resilient member outer diameter and said second parabolic member to bias said second parabolic member away from said resilient member outer diameter; and
   a hydrophobic material within said cavity.

2. The seal assembly as recited in claim 1, further comprising an annular flange radially extending from said second member, said annular flange engageable with a counterbore within said first member.

3. The seal assembly as recited in claim 2, wherein said annular flange is spaced away from said counterbore such that contaminants may drain therefrom.

4. The seal assembly as recited in claim 1, wherein said first and a second parabolic members define a substantially V-shape in cross section, said cavity defined within said V-shape.

5. The seal assembly as recited in claim 1, wherein said cavity opens toward said second member.

6. The seal assembly as recited in claim 1, wherein said cavity opens toward said first member.

7. The seal assembly as recited in claim 1, wherein said resilient member defines a second cavity, said first cavity open toward said first member and said second cavity open toward said second member.

8. The seal assembly as recited in claim 1, wherein said hydrophobic material includes a hydrophobic silicon gel.

9. The seal assembly as recited in claim 1, wherein said first annular seal and said second annular seal comprise an O-ring.

10. A gearbox assembly, comprising:
    a housing;
    a shaft extending from and rotatable relative to said housing;
    a first member mounted to said housing;
    a second member rotatable relative to said first member, said second member mounting said shaft;
    a resilient member adjacent said first member and said second member, said resilient member defining a resilient member outer diameter and a first and a second parabolic member which define a cavity open toward said second member;

a first annular seal mounted between said resilient member outer diameter and said first parabolic member to bias said first parabolic member away from said resilient member outer diameter;

a second annular seal mounted between said resilient member outer diameter and said second parabolic member to bias said second parabolic member away from said resilient member outer diameter; and a hydrophobic material within said cavity.

11. The gearbox assembly as recited in claim 10, further comprising an annular flange radially extending from said second member, said annular flange engageable with a counterbore within said first member.

12. The gearbox assembly as recited in claim 11, wherein said annular flange is spaced away from said counterbore such that contaminants may drain therefrom.

13. The gearbox assembly as recited in claim 10, wherein said first and a second parabolic members define a substantially V-shape in cross section, said cavity defined within said V-shape.

14. The seal assembly as recited in claim 10, wherein said first annular seal and second annular seal comprise an O-ring.

15. An axle assembly, comprising:

a housing;

a shaft extending from and rotatable relative to said housing;

a first member mounted to said housing;

a second member rotatable relative to said first member, said second member mounting said shaft;

a resilient member adjacent said first member and said second member, said resilient member defining a resilient member outer diameter and a first and a second parabolic member which define a cavity open toward said second member;

a first annular seal mounted between said resilient member outer diameter and said first parabolic member to bias said first parabolic member away from said resilient member outer diameter;

a second annular seal mounted between said resilient member outer diameter and said second parabolic member to bias said second parabolic member away from said resilient member outer diameter; and a hydrophobic material within said cavity.

16. The axle assembly as recited in claim 15, further comprising an annular flange radially extending from said second member, said annular flange engageable with a counterbore within said first member.

17. The aide assembly as recited in claim 16, wherein said annular flange is spaced away from said counterbore such that contaminants may drain therefrom.

18. The axle assembly as recited in claim 16, wherein said housing contains a differential.

19. The axle assembly as recited in claim 18, wherein said shaft is an input to said differential.

20. The axle assembly as recited in claim 15, wherein said first annular seal and said second annular seal comprise an O-ring.

* * * * *

UNITED STATES PATENT AND TRADEMARK OFFICE
CERTIFICATE OF CORRECTION

PATENT NO. : 6,663,110 B2
DATED : December 16, 2003
INVENTOR(S) : Platner

It is certified that error appears in the above-identified patent and that said Letters Patent is hereby corrected as shown below:

Column 6,
Line 19, "aide" should read as -- axle --

Signed and Sealed this

Fourth Day of May, 2004

JON W. DUDAS
*Acting Director of the United States Patent and Trademark Office*